United States Patent [19]

Schilling

[11] Patent Number: 5,682,200
[45] Date of Patent: Oct. 28, 1997

[54] TELECINE SCANNER

[75] Inventor: Horst Schilling, Griesheim, Germany

[73] Assignee: U.S. Philips Corporation, New York, N.Y.

[21] Appl. No.: 601,895

[22] Filed: Feb. 15, 1996

[30] Foreign Application Priority Data

Feb. 18, 1995 [DE] Germany ............................ 19505439.3

[51] Int. Cl.[6] .............................. H04N 3/36; H04N 5/253
[52] U.S. Cl. .................. 348/97; 348/96; 348/106; 348/105
[58] Field of Search ................... 348/96, 97, 106, 348/98, 105, 110–112; H04N 3/36, 5/253

[56] References Cited

U.S. PATENT DOCUMENTS

| | | | |
|---|---|---|---|
| 4,310,856 | 1/1982 | Poetsch | 348/97 |
| 4,524,392 | 6/1985 | Poetsch | 348/97 |
| 4,823,204 | 4/1989 | Holland | 348/97 |
| 4,875,102 | 10/1989 | Poetsch | 348/97 |
| 4,903,131 | 2/1990 | Lingemann et al. | 348/97 |
| 4,994,918 | 2/1991 | Lingemann | 348/97 |
| 5,146,321 | 9/1992 | Lees et al. | 348/97 |
| 5,194,958 | 3/1993 | Pearman et al. | 348/97 |
| 5,402,166 | 3/1995 | Mead et al. | 348/97 |
| 5,430,477 | 7/1995 | Bachmann et al. | 348/97 |
| 5,475,423 | 12/1995 | Elberger | 348/97 |

Primary Examiner—Howard W. Britton
Assistant Examiner—Vu Le
Attorney, Agent, or Firm—Edward W. Goodman

[57] ABSTRACT

A telecine scanner having a capstan roll (3) continuously advancing the film through a picture scanning station, includes a capstan motor (2) controlled by a phase signal derived from a tachodisc (7) of a sprocket (8) driven by the film (1). To improve vertical picture steadiness, this phase signal is derived from a higher-frequency pulse signal after the capstan roll (3) has run up to speed.

3 Claims, 1 Drawing Sheet

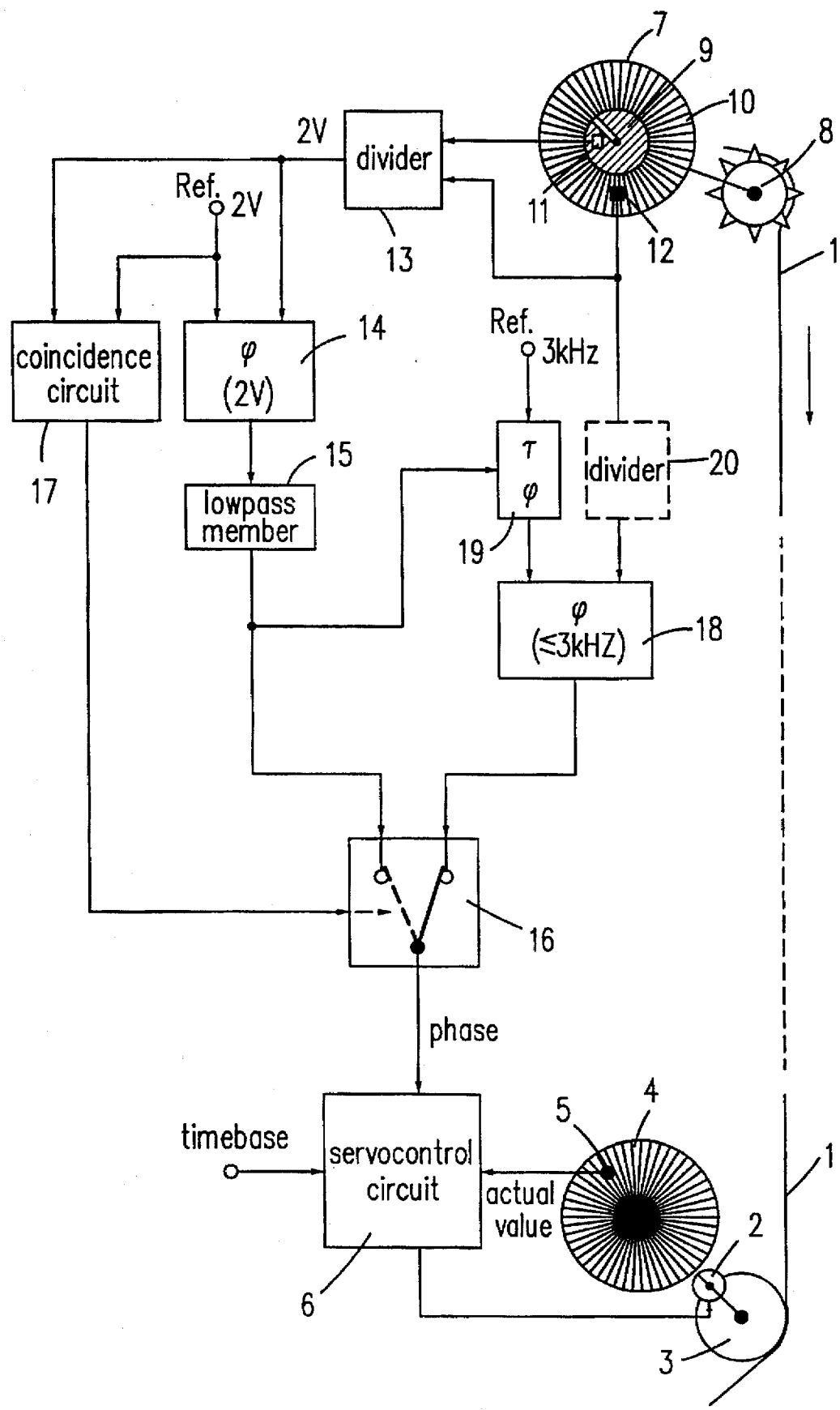

TELECINE SCANNER

BACKGROUND OF THE INVENTION

1. Field of the Invention

The invention relates to a telecine scanner having a capstan roll continuously advancing the film through a picture scanning station, which roll is driven by a capstan motor controlled by means of a servo-control circuit, and having a sprocket with a tachodisc, which sprocket is driven by the film, the servo-control circuit receiving, on the one hand, as a speed signal both a timebase pulse repetition signal and an actual-value pulse repetition signal derived from the tachodisc of the capstan motor, and, on the other hand, a phase signal derived from the tachodisc of the sprocket.

When scanning motion films on television, tracking errors which, may lead to visible horizontal and vertical picture steadiness errors, may be caused, for example, by feed-rate fluctuations, dynamic changes of the film run due to elasticity of the film material, and, particularly, by incorrect frame positions on the film. Whereas, for lack of appropriate reference points, a picture steadiness error may not be disturbing when projecting films in a darkened cinema, the disturbing effect may become considerably stronger when films are displayed on television with its illuminated surroundings and rapid changes between electronic recordings and film recordings. Very stringent requirements are imposed on picture steadiness in the methods combining computer graphics with film recordings in which chromakey techniques are used, because the relative movement of keyed film portions in the stationary residual picture is very disturbing.

2. Description of the Related Art

In the current constant-speed scanners, the horizontal picture steadiness is determined by the mechanical lateral guidance of the film strip in the film gate. The vertical steadiness is determined by the position of the film image with respect to the fixed scanning raster, i.e., the capstan-drive position essentially influences the vertical steadiness error.

SUMMARY OF THE INVENTION

It is therefore an object of the present invention to provide a telecine scanner of the type described in the opening paragraph in which the vertical steadiness error is minimized.

This object is solved in that, after the telecine scanner has been switched on, the phase signal for the servo-control circuit is first derived from the 2V pulse signal and, after the capstan roll has run up speed for the selected mode of operation, the phase signal is derived from a pulse signal having a higher frequency.

The telecine scanner in accordance with the invention has the advantage that an optimum vertical steadiness is achieved when a film is being scanned at the normal projection speed. Moreover, the phase stability is improved by the increased scanning rate.

These and other aspects of the invention will be apparent from and elucidated with reference to the embodiment described hereinafter.

BRIEF DESCRIPTION OF THE DRAWING

The sole FIGURE shows part of a telecine incorporating the subject invention.

DESCRIPTION OF THE PREFERRED EMBODIMENT

The sole FIGURE shows only a pan of a film-feed device for a telecine scanner, including the vertical steadiness error correction pans that are essential for the invention. The film 1 is continuously advanced in the direction of the arrow by a rubber-clad capstan roll 3 driven by a capstan motor 2 and is speed and phase-controlled. A pulse tachodisc 4 having several thousand increments is arranged at the rear end of the motor shaft for the capstan roll 3. Arranged in front of this disc 4 is a scanner 5 with which a pulse repetition signal, comprising information about speed and direction of rotation of the capstan roll 3, can be derived. This pulse repetition signal is applied, as an actual-value pulse repetition signal, to the first input of a servo-control circuit 6 whose second input receives a timebase pulse repetition signal. A control signal, with which the capstan motor 2 is speed and phase-controlled at every mode of operation, can be taken from the output of the servo-control circuit 6, a third input of which receives a phase control signal.

This phase control signal is gained—for example, for automatic correction of film shrinkage—from the pulses derived from a tachodisc 7 which is arranged on a common shaft with a sprocket g and rotated by means of this sprocket 8 which is driven by the film 1. The tachodisc 7 has two concentric tracks 9 and 10, the inner one (9) having a white index stripe on a black field and the outer one (10) having 480 black-white fields. The tracks are scanned, for example, by means of photodiodes 11 and 12, respectively.

The pulse signal supplied by the photodiode 12 is applied, via a divider 13, to a first input of a 2V phase comparison circuit 14 whose second input conveys the 2V studio reference signal. The film frame is synchronized with the studio V pulse by means of this signal. The index signal supplied by the photodiode 11 is used, for example, for resetting the divider 13. Since a low-pass filtering operation must be performed for reasons of stability, a low-pass member 15 is connected to the output of the phase comparison circuit 14. As a result of this averaging operation, the effect of correction decreases with an increasing interference frequency, while tolerances of the raw film cumulate over a comparatively large number of frames.

After the telecine scanner has been switched on during run-up, the phase control signal then gained is first applied to the phase input of the servo-control circuit 6 via a change-over switch 16 whose first input conveys the signal when this change-over switch 16 is in the position shown by means of a broken line. Moreover, these two 2V pulse signals are applied to a coincidence circuit 17 in which they are tested, accordingly. As soon as the two 2V pulse signals coincide, a switching signal is applied to the change-over switch 16 which is then switched to the position shown. The phase signal at the second input of the change-over switch 16 is then switched to the output.

This phase signal is generated by a further phase comparison circuit 18 whose inputs convey the higher-frequency 3 kHz pulse signal scanned by the outer track 10 by means of the photodiode 12 and the corresponding 3 kHz reference signal.

A phase-adjusting circuit 19, which is controlled in accordance with the 2V adjustment by the phase signal gained from the phase comparison circuit 14, is arranged in the supply line of the reference signal to the phase comparison circuit 18. A divider circuit 20, with which a frequency division of the higher-frequency pulse signal is also possible, may be arranged in the supply line of the higher-frequency pulse signal between the photodiode 12 and the further phase comparison circuit 18. The associated reference signal should then of course also be frequency-divided, accordingly.

The above-described functions of the separate circuit components may of course also be performed by means of a microprocessor and the corresponding software.

When the normal projection speed for a selected mode of operation has been reached, this phase signal, which is derived from the higher-frequency pulse signal and is then effective, can realize a better phase stability by virtue of the higher scanning rate, so that the vertical picture steadiness is considerably improved.

I claim:

1. A telecine scanner having a capstan roll continuously advancing film through a picture scanning station, and a capstan motor having an attached first tachodisc, said capstan motor being controlled by a servo-control circuit for driving the capstan roll, said telecine scanner further having a sprocket with a second tachodisc, said sprocket being driven by the film, the servo-control circuit receiving, as a speed signal, both a timebase pulse repetition signal and an actual value pulse repetition signal derived from the first tachodisc attached to the capstan motor, said servo-control circuit further receiving a phase signal derived from the second tachodisc of the sprocket, characterized in that, after the telecine scanner has been switched on, the phase signal for the servo-control circuit is first derived from an applied 2V pulse signal and, after the capstan roll has run up to speed for a selected mode of operation, the phase signal is derived from an applied pulse signal having a higher frequency, characterized in that said telecine scanner comprises first means for comparing pules derived from the second tachodisc with the applied 2V signal for generating the phase signal derived from the 2V pulse signal, and second means for comparing pulses derived from the second tachodisc with the applied pulse signal having a higher frequency for generating the phase signal derived from the higher-frequency pulse signal.

2. A telecine scanner as claimed in claim 1, characterized in that said first means comprises a first phase comparison circuit, and said telecine scanner further comprises a low-pass member to which an output of said first phase comparison circuit is applied, an output of said low-pass member being connected to a first input of a change-over switch and to a control input of a phase-adjusting circuit, said phase-adjusting circuit being arranged in a supply line for the applied pulse signal having a high frequency, and said second means comprises a second phase comparison circuit, an output of said second phase comparison circuit being applied to a second input of the change-over switch, said change-over switch being controlled by a coincidence circuit which receives both the 2V pulse signal taken from the tachodisc of the sprocket and the applied 2V signal, and in that an output of the change-over switch is connected to a phase input of the servo-control circuit.

3. A telecine scanner as claimed in claim 2, characterized in that the higher-frequency pulse signal taken from the tachodisc of the sprocket is applied to a first input of the second phase comparison circuit via a divider circuit, and in that the applied pulse signal is applied to a second input of the second phase comparison circuit via the phase-adjusting circuit.

* * * * *